Aug. 3, 1926.  
M. T. WESTON  
VARIABLE SPEED DRIVE  
Filed Sept. 26, 1925
1,594,396
3 Sheets-Sheet 1
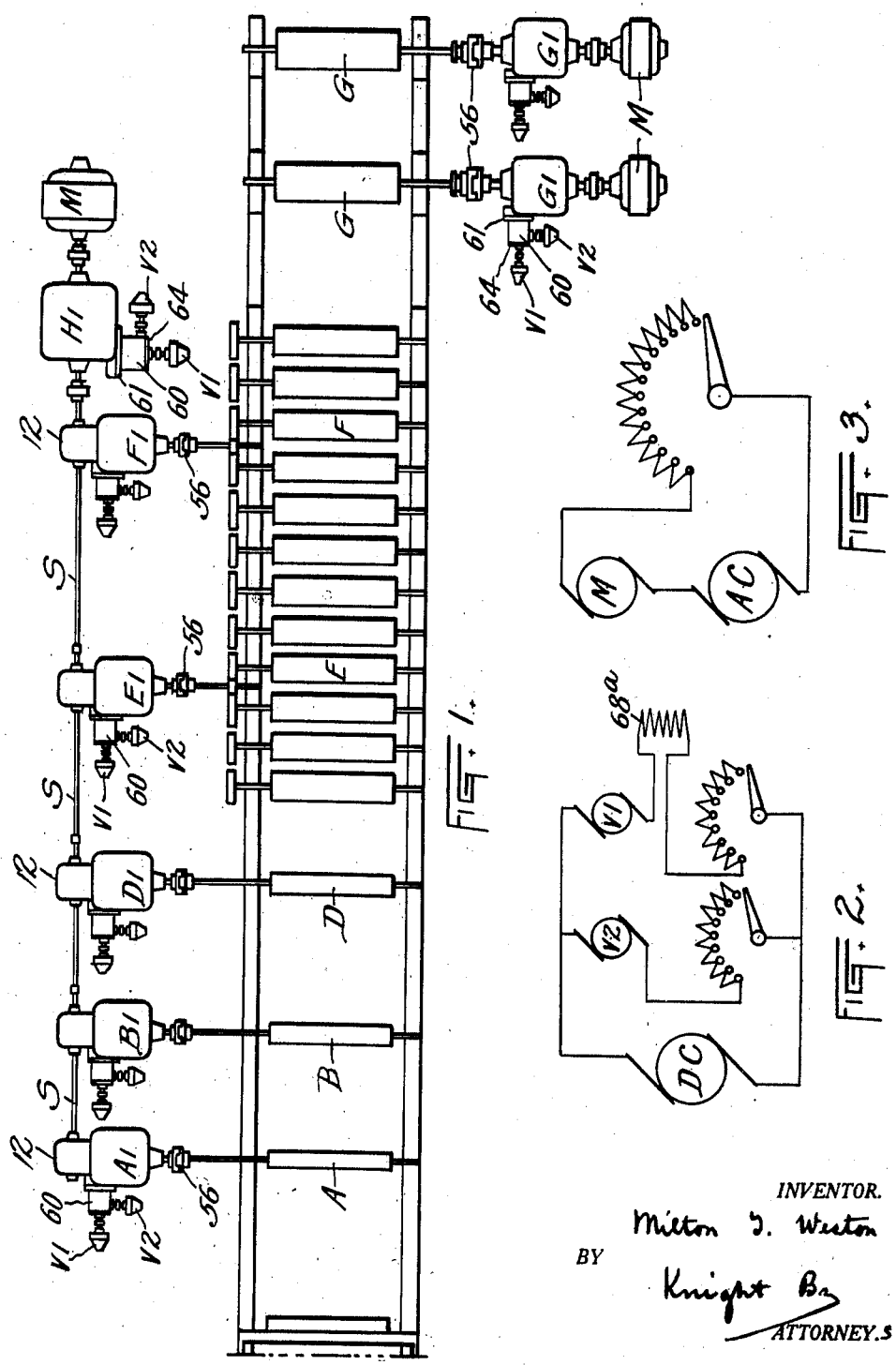
INVENTOR.
Milton T. Weston
BY
Knight Bro.
ATTORNEY.S

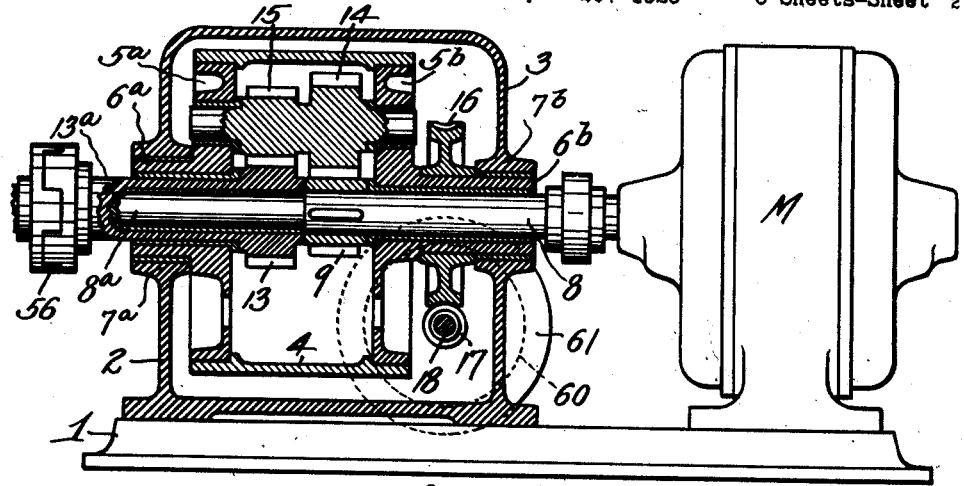

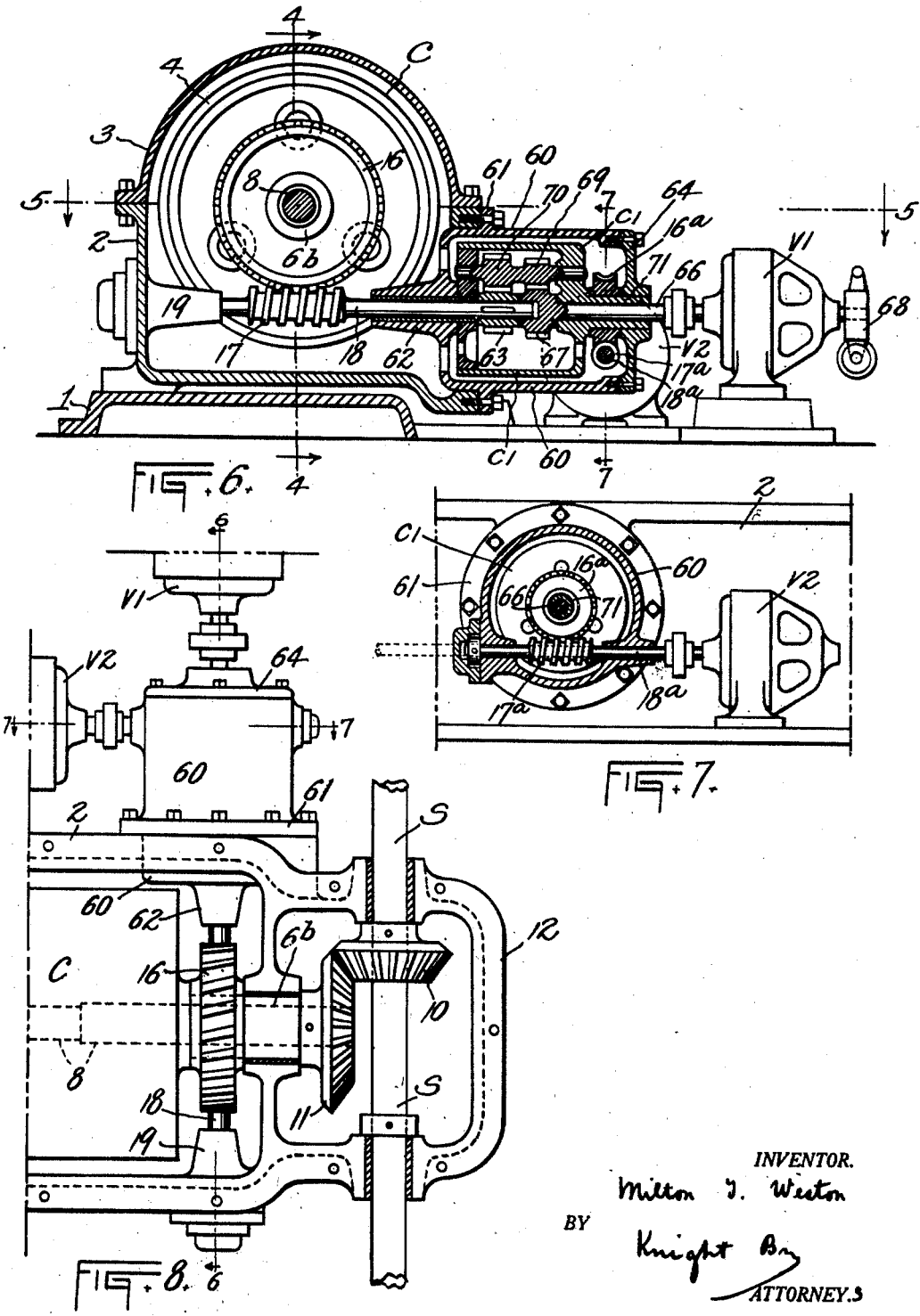

Patented Aug. 3, 1926.

1,594,396

UNITED STATES PATENT OFFICE.

MILTON T. WESTON, OF NEW YORK, N. Y.

VARIABLE-SPEED DRIVE.

Application filed September 26, 1925. Serial No. 58,923.

This invention relates to variable speed drives such as that shown and described in my copending application on variable speed driving mechanism, which was filed in the United States Patent Office on April 17, 1925 and serially numbered 23,835.

The primary object of my invention is to provide variable speed driving mechanism of improved construction by means of which the variations of speed in a machine or machine part may be regulated to an extreme degree of precision irrespective of the range of variation in speed of the parts through which power is transmitted to said machine or part.

One of the objects of the present invention is to provide an improved power-transmitting unit comprising positively connected parts by means of which a machine or machine part may be set in motion, accelerated or retarded by extremely fine increments or decrements in speed from a motor or engine running at full speed, such, for example, as a synchronous motor.

Another object of my invention is to provide an improved dual variable speed motor control for variable speed mechanisms.

Another object of invention is to provide an improved variable speed drive for the several sections of a paper-making machine and whereby the relative speed of said sections may be regulated with an extreme degree of precision.

Other and further objects of invention will appear in the specification and be pointed out in the claims in connection with the accompanying drawings which show a preferred embodiment of my invention and in which, Figure 1 is a top plan view of a paper-making machine having my improved variable speed drive applied thereto.

Figure 2 is a wiring diagram for the dual motor control.

Figure 3 shows a wiring diagram for one of the main motor circuits.

Figure 4 is an axial section of one of the main power-transmission units, said section being taken on the line 4—4, Figure 6, parts being broken away and parts shown in side elevation.

Figure 5 is a top plan view of the same with the cover removed, corresponding to the line 5—5 of Figure 6.

Figure 6 is a vertical section corresponding to the line 6—6, Figure 8.

Figure 7 is a section on the line 7—7, Figure 6; and

Figure 8 is a top plan view of one of the power-transmission units as applied to a paper-machine section driven from a power shaft which is common to a plurality of said paper-machine sections.

In its present embodiment, my invention is adapted to a paper-making machine such as that shown and described in my above-identified copending application. According to the present case, a finer degree of regulation may be had in the variable speed controlling mechanism than is possible in my earlier case and such regulation is applicable to all speeds. Furthermore, according to this application, I employ only positively geared means and eliminate entirely the clutch or the ratchet means employed in my above-identified application. The present invention contemplates the use of a differential gear control, which may be similar in construction to the main variable speed element, and in which two or more independently operable positively geared elements either separately or jointly affect a third holding or controlling element so as to obtain any desired speed regulation over the maximum speed range.

According to my application Serial Number 23,835, I use a single variable speed motor $v$ which is adapted to produce a maximum variation (of say 100%) in a particular unit through one set of change speed gears and a relatively low variation (of say 5%) through an alternate set of change speed gears. Under these conditions, when the motor $v$ is operating through the change speed gears giving the maximum variation, each step in the controller will produce a relatively large degree of variation and the increment of change in the speed of the paper machine section will be correspondingly large. On the other hand, when the motor $v$ is operating through the change speed gears giving the minimum variation, each step in the controller will produce a relatively small degree of variation and the increment of change in the speed of the paper machine section will be correspondingly small. Thus, a very fine degree of regulation may be obtained but such variation takes place only at the maximum speed of the paper machine section when driven by synchronous motors M and also corresponds to the maximum variation between the several units when said units are driven from a common power shaft S.

Power-transmission unit.

Referring more particularly to Figures 4, 5, 6, 7, and 8, in the present embodiment of my invention, each power-transmitting unit includes a base 1 on which is mounted a casing comprising a bottom section 2 and a removable cover section 3. In this casing is mounted a revolvable cage C comprising a cylindrical shell 4 and two end discs $5^a$ and $5^b$ secured in opposite ends of the said cylindrical shell. Each of the end discs $5^a$ and $5^b$ has a hollow trunnion $6^a$ and $6^b$ projecting axially and mounted to revolve in suitable bearings $7^a$ and $7^b$ formed partly in section 2 and partly in section 3 of said casing. A driving shaft 8 is mounted to revolve in the hollow bore of the trunnion $6^a$ and carries a driving pinion 9 keyed to it within the cage C. As shown in Figures 4 and 5, the driving shaft 8 is directly connected to a main driving motor M which is preferably of the synchronous or constant speed type and mounted on the base 1. According to Figures 1 and 8, said driving shaft 8 is driven from a power shaft S which may be common to a plurality of sections of a paper-making machine. For this purpose, a bevel pinion 10 which is keyed to shaft S, meshes with a bevel gear 11 keyed to driving shaft 8 within an extension 12 of the casing 2. Within the revolving cage 4, a spur pinion 9 keyed to shaft 8 is coaxially arranged with respect to a driven gear 13 and connected thereto by planetary gears 14 and 15. Said driven gear 13 is provided with an extended sleeve hub $13^a$ which is journalled freely upon the reduced portion $8^a$ of said driving shaft within hollow trunnions $6^a$ of the end disc $5^a$. Parallel to the axis of the cage C and at equal distances therefrom the planetary gears 14 and 15 are arranged in three clusters to rotate in suitable bearings in the end discs $5^a$ and $5^b$ in each of the revolving cages C. In operation, the driving pinion 9, cluster gears 14 and 15, and driven gear 13, function as a simple speed reducer when the cage C is held so as not to revolve, i. e. the extended sleeve hub $13^a$ will have a fixed reduced speed with respect to the driving shaft 8. Revolving the cage in either direction, however, introduces a variation in the speed of the sleeve hub $13^a$ with respect to its normal reduced speed when the cage is fixed. When the cage C is revolved in the same direction as the driving shaft 8, the speed of the sleeve hub $13^a$ is increased at a rate which is proportional to the speed of the cage. When the cage C is revolved in the direction opposite to the direction of rotation of the driving shaft 8, the speed of the sleeve hub $13^a$ will be reduced in proportion to the speed of the cage. When a certain speed of counter rotation of the cage C is reached, the sleeve hub $13^a$ will remain stationary and any further increase in the speed of counter rotation will cause the sleeve hub $13^a$ to rotate backwardly or oppositely to its normal direction of rotation.

For controlling the revolutions of each of the cages C, a worm wheel 16 may be keyed to the trunnion $6^b$ to mesh with a worm 17 on a transverse shaft 18.

Variable speed mechanism control.

Referring more especially to Figure 6, it will be seen that the shaft 18 which carries the main holding or controlling worm 17, is journalled at one end in a bearing 19 carried by the casing 2, the other end of said shaft being journalled in a bearing 62 in the adjacent end of a cylindrical housing 60. The housing 60 is provided with a flange 61, said flange being bolted to the casing 2 around the edges of an opening in said casing. Keyed to the outwardly-presented end of shaft 18, is a driven gear 63. A cap 64 bolted to the outer end of housing 60, carries a bearing 65 within which is journaled a hollow trunnion 71 which projects from one end of a planetary support or cage $C^1$, the other end of said cage being journalled upon a bearing sleeve which projects inwardly from bearing 62 around the worm shaft 18. A driving shaft 66 which is journalled within the trunnion 71 is arranged in axial alignment with the worm shaft 18 but rotatable relatively thereto, a spur being formed integrally therewith. The outer end of shaft 66 may be coupled directly to a small variable speed motor $v^1$ and may be driven thereby or under certain conditions to be hereinafter referred to, may be held stationary by an electromagnetic brake 68 which is arranged to operate upon the projecting end of the armature shaft of said motor $v^1$. The coil $68^a$ of said magnetic brake is preferably arranged in series with the motor $v^1$ as shown in Figure 2 and according to which the armature shaft may be released whenever the energizing current is turned on and immediately locked against movement as soon as the current is turned off. Arranged within the planetary support or cage $C^1$, are clusters of planetary gears 69 and 70 which form a variable speed connection between driving gear 67 and driven gear 63.

Secured to the outer end of trunnion 71 which turns in the bearing 65 on cap 64, is a worm wheel $16^A$ which meshes with a worm $17^A$ on the worm shaft $18^A$, the latter shaft extending transversely through the housing 60. The outer end of the worm shaft $18^A$ is directly connected to a small variable speed motor $v^2$ as shown in Figures 4, 7, and 8. It will be understood that while I show the epicyclic form of differential gearing on account of its reliable and simple construction, any form of differential gearing may be used for the purpose.

In Figure 1 of the drawings is shown a preferred adaptation of my invention to a paper-making machine, said machine comprising a couch section A, 1st. press B, 2d. press D, 1st. dryer E, 2d. dryer F, and calender sections G, G. Said sections with the exception of calenders G, G, are directly and positively connected to the power shaft S through the variable speed units $A^1$, $B^1$, $D^1$, $E^1$, and $F^1$ which have been hereinbefore described. As shown in Figures 1 and 4, said common power shaft is preferably connected to motor M through a variable speed unit $H^1$ of similar construction, a clutch 56 being interposed between shaft S and variable speed unit $H^1$. By means of this construction and under the control of variable speed motors $v^1$ and $v^2$ connected to the unit $H^1$, power shaft S may be accelerated from rest to full speed by motor M while the latter is operating at full speed, thus making it possible to secure the advantages of a fixed speed or synchronous motor for the main driving motor M. The variable speed units $A^1$, $B^1$, etc. may be similarly utilized for separately accelerating the corresponding sections of the paper machine from the power shaft S irrespective of the speed of the latter or said sections may be accelerated together with power shaft S through unit $H^1$. In a similar manner, calender sections G, G, may be accelerated or retarded through variable speed units $G^1$, $G^1$, and when desired and wherever the conditions of the web are suitable the acceleration or retardation of any particular section of the paper machine, may be automatically controlled by the web at those points in the manner shown and described in my above-identified copending application. Simple electrical diagrams for controlling the variable speed motors $v^1$ and $v^2$ and for starting and stopping the fixed speed or synchronous motor M, are shown in Figures 2 and 3 of the drawings.

Referring to Figures 4, 5, and 6, we will assume that all parts are at rest. When it is desired to start any given unit such as one of the calender units G', G' the jaw clutch 56 (which also functions as a flexible coupling) is disengaged and motor M (preferably synchronous) is brought up to full speed by means of a suitable starter represented diagrammatically in Figure 3. The small auxiliary motor $V^1$ is also brought up to substantially full speed, the ratio of the differential gearing in the cage C' being such that at approximately full speed the motor $V^1$ will permit the cage C to revolve at the correct speed to cause the sleeve hub $13^a$, on which one member of the jaw clutch 56 is mounted, to come to rest. The jaw clutch 56 may then be engaged without shock as both halves remain substantially at rest as long as the main motor M and auxiliary motor $V^1$ maintain their relative speeds.

The calender section G of the paper machine may now be started by simply slowing down the speed of the motor $V^1$ which reduces the speed of the cage C and thus gradually applies the load to the main motor M which continues to run at full or synchronous speed. Inasmuch as the worm 17 is designed as a holding worm for restraining the revolution of cage C, no load is thrown on the small motor $V^1$ which has only to overcome the frictional work in the gearing.

As previously explained, one step in the controller for motor $V^1$ will cause an increment of change in the speed of the paper machine section which, though relatively small, is yet too great to give the necessary degree of regulation for properly adjusting the "draw" in the paper web. In order to secure the necessary refinement in this adjustment, I use a second auxiliary motor $V^2$ which operates upon the same differential gearing as motor $V^1$ but at a relatively greater speed reduction through worm $17^a$ and worm wheel $16^a$. For this reason one step in the controller for small motor $V^2$ will cause a very small change in the paper speed for that section at that point. This small increment of change in speed is superimposed upon the speed produced by the auxiliary motor $V^1$ and is therefore operatable at any and all speeds of motor $V^1$ from zero to full speed, while the main motor M continues to run at its constant or synchronous speed.

A similar starting of the paper machine sections A, B, D, E, and F, may be effected from power shaft S thru the operation of the clutch-couplings 56 and the control of variable speed units $A^1$, $B^1$, $D^1$, and $F^1$ after said power shaft has been accelerated thru variable speed unit $H^1$ and the motor M connected thereto.

It will be understood from Figures 2 and 6, that whenever variable speed motor $v^1$ is deenergized, magnetic brake coil $68^a$ will be deenergized and the brake 68 automatically applied. From an inspection of Figures 1, 2, and 6, it will be seen that this condition may hold without interfering with the variable speed control of motor $v^2$.

It will be understood from the foregoing description that by employing the positively geared variable speed mechanisms for accelerating the several sections of a paper-making machine from a condition of rest, it becomes possible to employ a synchronous motor having but a fraction of the power of motors commonly employed for driving machines of this character. By means of my improved construction and arrangement, I am able to gradually apply the full power of a synchronous motor M while running at full speed, to the power shaft S or to any particular section of the machine and thereby avoid over-motoring. The starting torque of some sections of a paper-making machine is five times as great as the running torque. In consequence, it has become customary in some instances to over-motor some sections 100%. It will be seen therefore that in spite of the small starting torque of a synchronous motor, it yet becomes possible, by an adaptation of my invention toward this end, to secure all the advantages of such a motor by accelerating it up to full speed before any load of consequence is thrown upon it and afterwards applying the load thereto in such a gradual manner as not to lessen the speed of said motor. This improved result is made possible by the superimposed regulation of one of the small variable speed motors upon the step-by-step regulation of the other of said variable speed motors.

I claim :—

1. Power transmission mechanism comprising driving and driven elements, planetary gearing operatably connecting said elements, means including planetary gearing for operating the first-mentioned planetary gearing to vary the power-transmission between said driving and driven elements, and means for operating the second-mentioned planetary gearing for varying the power-transmission to the first-mentioned planetary gearing.

2. Power transmission mechanism comprising a power shaft, a driven shaft, planetary gearing operatably connecting said shafts, a motor, and planetary gearing connecting said motor to the first-mentioned planetary gearing for varying the power transmission between said motor and the first-mentioned planetary gearing.

3. Power transmission mechanism comprising a driving gear, a driven gear, planetary gears operatably connecting said gears, means including planetary gears for revolving the first-mentioned planetary gears for varying the power transmission between said driving and driven gears, and means for revolving the second-mentioned planetary gears for varying the rate of change in the power-transmission between said gears.

4. The combination with variable speed power-transmitting planetary gearing, of a power-source connected to and supplying power to said planetary gearing, a second power-source for imparting the planetary movements to said planetary gearing, other variable speed planetary gearing interposed between said second power-source and the first-mentioned planetary gearing, and means for controlling the planetary movements of the second-mentioned planetary gearing.

5. Power transmission mechanism comprising a power-shaft, a driven shaft, positive variable speed mechanism connecting said shafts, other positive variable speed mechanism connected to the first-mentioned variable speed mechanism, and means for driving the second-mentioned varying speed mechanism at variable rates of speed.

6. Power transmission mechanism comprising a power shaft, a driven shaft, variable speed mechanism connecting said shafts, a variable speed motor, variable speed mechanism connecting said motor to the first-mentioned variable speed mechanism, and a variable speed motor connected to the second-mentioned variable speed mechanism.

7. Power transmission mechanism comprising a power shaft, a driven shaft, variable speed mechanism connecting said shafts, a reversible motor, variable speed mechanism connecting said motor to the first-mentioned variable speed mechanism for varying the power transmission between said power and driven shafts, and a variable speed motor connected to the second-mentioned variable speed mechanism.

8. Power transmission mechanism comprising a power shaft, a driven shaft, variable speed mechanism connecting said shafts, a reversible motor, other variable speed mechanism connecting said motor to the first-mentioned variable speed mechanism for varying the power transmission between said power and driven shafts, and a motor connected to the second-mentioned variable speed mechanism.

9. In a machine of the character described, the combination with a main driving motor, of a machine section to be driven thereby, power connections between said motor and machine section including variable speed mechanism, and power-driven connections including other variable speed mechanism for controlling the operation of the first-mentioned variable speed mechanism.

10. In a machine of the character described, the combination with a main driving motor, of a machine section to be driven thereby, power connections between said motor and machine section including positive variable speed mechanism, an auxiliary motor, power connections between said auxiliary motor and said variable speed mechanism including other positive variable speed mechanism, a second auxiliary motor, and means for separately controlling said auxiliary motors.

11. In a machine of the character described, the combination with a synchronous motor, of a machine section to be driven thereby, power connections between said motor and machine section including variable speed mechanism, and power-driven connections including variable speed mechanism for controlling the operation of the first-mentioned variable speed mechanism.

12. In a machine of the character described, the combination with a main driving motor of a machine section to be driven thereby, power connections between said motor and machine section including variable speed mechanism, an auxiliary motor, power connections between said auxiliary motor and said variable speed mechanism including other variable speed mechanism, a second auxiliary motor, means for separately controlling said auxiliary motors, and means under the control of one of said motor controlling means for braking the armature shaft of that motor.

13. In a machine of the character described, a main driving motor, a main drive shaft, variable speed mechanism connecting said motor to said shaft, power driven variable speed mechanism connected to the first-mentioned variable speed mechanism, other power driven variable speed mechanism connected to the second-mentioned variable speed mechanism, a machine section to be driven, and power connections including variable speed mechanism arranged between said main drive shaft and said machine section.

14. In a machine of the character described, a main driving synchronous motor, a main drive shaft, variable speed mechanism connecting said motor to said shaft, variable speed mechanism for controlling the first-mentioned variable speed mechanism, a machine to be driven, and power connections arranged between said main drive shaft and said machine section.

15. In a machine of the character described, a main driving motor, a main drive shaft, variable speed mechanism connecting said motor to said shaft, power driven variable speed mechanism connected to the first-mentioned variable speed mechanism, other power driven variable speed mechanism connected to the second-mentioned variable speed mechanism, a machine section to be driven, power connections including variable speed mechanism arranged between said main drive shaft and said machine section, power-driven variable speed mechanism connected to the last-mentioned variable speed mechanism, and other power-driven variable speed mechanism connected to the last said power-driven variable speed mechanism.

16. In a machine of the character described, a main driving synchronous motor, a main drive shaft, variable speed mechanism connecting said motor to said shaft, a variable speed motor for controlling said variable speed mechanism interposed between said variable speed motor and the first-mentioned variable speed mechanism, a machine section to be driven, and power connections between said main drive shaft and said machine section.

17. The combination with variable speed power-transmitting planetary gearing, of a synchronous motor connected to said planetary gearing, a variable speed motor for imparting the planetary movements to said planetary gearing, other planetary gearing interposed between said variable speed motor and the first-mentioned planetary gearing, and means for controlling the planetary movements of the second-mentioned planetary gearing.

18. In a machine of the character described, the combination with a synchronous motor and a shaft to be driven thereby, of variable speed driving connections between said motor and shaft, a variable speed motor for operating said connections, and other variable speed connections interposed between the variable speed motor and the first-mentioned variable speed connections.

19. In a machine of the character described, a machine to be driven, a synchronous motor for driving said machine, driving connections between said synchronous motor and said machine, said connections including variable speed mechanism, a variable speed reversible motor connected thereto, other variable speed mechanism for modifying the operation of the first-mentioned variable speed mechanism, and a variable speed motor connected to said other variable speed mechanism.

20. In a machine of the character described, the combination with a synchronous motor and a shaft to be driven thereby, of driving connections between said motor and shaft, including variable speed mechanism, a motor for controlling the operation of said variable speed mechanism, and other variable speed mechanism interposed between said motor and the first-mentioned variable speed mechanism.

21. In a machine of the character described, a machine to be driven, a synchronous motor for driving said machine, driving connections between said synchronous motor and said machine, said connections including variable speed mechanism, and power-driven connections including other variable speed mechanism for controlling the operation of the first-mentioned variable speed mechanism.

22. In a machine of the character described, the combination with a synchronous motor and a shaft to be driven thereby, of driving connections between said motor and shaft, including variable speed mechanism, a variable speed motor for controlling the operation of said variable speed mechanism, other variable speed mechanism interposed between the variable speed motor and the first-mentioned variable speed mechanism, and a variable speed motor for controlling the operation of the second variable speed mechanism.

23. In a machine of the character described, a machine provided with a shaft through which it is driven, a synchronous motor provided with a rotary shaft, gears carried by said shafts, planetary gears transmitting power between said shafts, a variable speed motor, connections between said motor and planetary gears for revolving the latter, said connections including planetary variable speed gearing, a planetary movement for revolving the last-mentioned planetary gears, and a variable speed motor connected to said planetary movement.

24. In a paper-making machine, a plurality of paper machine sections, power-driven positively-geared variable speed mechanism for driving each of said sections, variable positively-operated means for accelerating or retarding each variable speed mechanism, and other variable positively-operated means for controlling the amount of such acceleration or retardation.

25. In a paper-making machine, a plurality of paper machine sections, power-driven positively-geared variable speed mechanism for driving each of said sections, variable positively-operated means for accelerating or retarding each variable speed mechanism within changing speed limits, and other variable positively-operated means for controlling the amount of such acceleration or retardation.

26. In a paper-making machine, a plurality of paper machine sections, power-driven positively-geared variable speed mechanism for driving each of said sections, variable positively-operated means for accelerating or retarding each variable speed mechanism, and other variable positively-operated means for controlling the amount of such acceleration or retardation.

27. In a paper-making machine, a plurality of paper machine sections, power-driven positively-geared variable speed mechanism for driving each of said sections, variable positively-operated means for accelerating or retarding each variable speed mechanism relatively to another of said variable speed mechanisms and within changing speed limits, and other variable positively-operated means for controlling the amount of such acceleration or retardation.

28. A power-transmission unit comprising a main driving motor, variable speed mechanism driven thereby, means for varying the operation of said variable speed mechanism including a second motor and a second variable speed mechanism, and a variable speed motor connected up to and varying the operation of the second-mentioned variable speed mechanism.

29. A power-transmission unit comprising a main driving motor, variable speed mechanism driven thereby, means for varying the operation of said variable speed mechanism including a second variable speed mechanism, and means for varying the operation of the second-mentioned variable speed mechanism.

30. A power-transmission unit comprising a synchronous motor, variable speed mechanism driven thereby, means for varying the operation of said variable speed mechanism including a variable speed motor and a second variable speed mechanism, and means for controlling the operation of the second-mentioned variable speed mechanism.

31. A power-transmission unit comprising a main driving motor, variable speed mechanism driven thereby, a variable speed motor and a second variable speed mechanism connected to and varying the operation of said variable speed mechanism, and a variable speed motor connected to and varying the operation of the second-mentioned variable speed mechanism.

32. The combination with a plurality of paper-machine sections, of a power shaft common thereto, variable speed mechanism including planetary gearing for connecting each of said machine sections to said power shaft, variable speed means for revolving said planetary gears, said variable speed means including a motor and variable speed connections with planetary gears, and a variable speed motor for revolving the last-mentioned planetary gears.

33. The combination with variable speed power-transmitting planetary gearing, of a constant speed power-source connected to and supplying power to said planetary gearing, a variable speed power-source for imparting the planetary movements to said planetary gearing, other variable speed planetary gearing interposed between said variable speed power-source and the first-mentioned planetary gearing, and means for controlling the planetary movements of the second-mentioned planetary gearing.

MILTON T. WESTON.